United States Patent [19]
Wangerin

[11] 3,806,235
[45] Apr. 23, 1974

[54] CONVERTIBLE RECORD VIEWER OR THE LIKE

[75] Inventor: Elmer O. Wangerin, Rochester, N.Y.

[73] Assignee: Eastman Kodak Company, Rochester, N.Y.

[22] Filed: Nov. 16, 1970

[21] Appl. No.: 90,162

Related U.S. Application Data

[63] Continuation of Ser. No. 730,223, May 20, 1968, abandoned.

[52] U.S. Cl. .................................. 353/26, 353/88
[51] Int. Cl. .......................................... G03b 23/12
[58] Field of Search .................. 353/27, 25, 26, 88

[56] References Cited
UNITED STATES PATENTS

| | | | |
|---|---|---|---|
| 3,183,771 | 5/1965 | Rutkus, Jr. | 353/27 |
| 3,078,770 | 2/1963 | Hunt et al. | 353/81 |
| 3,409,361 | 11/1968 | Hynes et al. | 353/27 X |

*Primary Examiner*—William D. Martin, Jr.

[57] ABSTRACT

A record viewer or similar apparatus is provided with readily interchangeable gate assemblies which enable the viewer to be converted to accommodate image bearing record media in either roll or sheet form.

7 Claims, 13 Drawing Figures

PATENTED APR 23 1974

ELMER O. WANGERIN
INVENTOR.

BY G. Herman Childress

Robert W Hampton
ATTORNEYS

ELMER O. WANGERIN
INVENTOR.

BY J. Herman Childress
Robert W. Hampton
ATTORNEYS

ELMER O. WANGERIN
INVENTOR.

BY D. Herman Childress
Robert O. Hampton
ATTORNEYS

CONVERTIBLE RECORD VIEWER OR THE LIKE

This application is a continuation of application Ser. No. 730,223, filed May 20, 1968, now abandoned.

BACKGROUND OF INVENTION

1. Field of Invention

The present invention relates to optical projectors or similar apparatus, particularly of the type commonly referred to as film readers, which are used to enlarge and display individual record media frames. More particularly, the invention relates to such apparatus which is convertible to accommodate record media in either roll or sheet form.

2. Description of the Prior Art

At the present time, most film readers are adapted to accommodate rolls of film provided with longitudinally disposed image areas. To view the film, a film supply reel is loaded onto the reader and the film thereon is threaded through a film gate and attached to a take-up reel so that the film can be wound between the two rolls in either direction to position any desired frame at a viewing position within the gate. Typically, an image of the film frame located within the film gate is projected onto the back surface of a translucent vertical screen by means of an objective lens and a mirror system. While a film frame is being viewed, it is accurately supported within the gate at a predetermined focal plane by being sandwiched between two transparent pressure plates. To prevent scratching the film as it is moved, these members preferably are separated during such movement, which may be accomplished either manually or by power operated winding means.

Rather than providing a series of image areas along an elongate strip, it is also known to arrange such image areas in rows and columns on flat sheets of film or other media. To display a particular frame on such a record sheet, the sheet is supported in a film gate by means whereby it can be moved laterally in any direction to position any desired frame in alignment with the optical projection system of the reader. Generally, the number of image frames provided by each such sheet is less than the number that can be recorded on a roll of film; but in many applications this limitation is out-weighed by the avoidance of using film reels and by the ease, speed, and economy with which the film sheets can be stored, retrieved, and selectively viewed.

SUMMARY OF THE INVENTION

In many installations, various considerations may indicate the advantage of employing both of the above-described systems in accordance with different record storage, retrieval and viewing criteria. In the present state of the art, however, such an installation necessitates the use of different reader units for displaying respectively the two different types of record media. Furthermore, since each such type of unit is capable of accommodating only one type of record media, it is very unlikely that the utilization requirements of the two different types of units will be sufficiently constant to insure optimum usage thereof. Therefore, and particularly in relatively small installations, it may be impractical to enjoy the advantages of both types of record systems due to the expense involved in providing the two different types of reader units.

To overcome this drawback to the use of both types of record systems in the same installation, the present invention is directed to enabling a film reader to be converted easily and inexpensively to accommodate either type of record media. In accordance with the invention, this objective is accomplished by providing a film reader or the like with easily interchangeable gate assemblies, adapted respectively to accommodate roll and sheet record media. The interchangeable gate assemblies, per se, also embody various novel features contributing to reliability, economy, ease of installation and protection of the record media against heat, scratching or other accidental damage. For example, the gate assemblies are designed to be attached to the reader unit in a manner which avoids the need for manually connecting or disconnecting mechanical or electrical drive means or the like to convert the unit from one mode of operation to the other. To enable the reader unit to accommodate roll film media of two different sizes when the roll film gate assembly is installed thereon, e.g., either 16mm or 35mm film, means are provided for adjusting the position of that gate assembly so that film media of either width can be supported thereby in centered alignment with the optical axis of the reader lens system. Additionally, the sheet film gate assembly is provided with novel means for establishing the position of any desired record frame at the viewing position in accordance with a predetermined rectangular coordinate coding system. These and other advantages and novel features realized in accordance with the invention will be apparent from the following detailed description of illustrative preferred embodiments thereof, reference being made to the accompanying drawings in which like reference characters refer to like elements.

BRIEF DESCRIPTION OF THE DRAWINGS

In the accompanying drawings:

FIG. 18 depicts a sheet of record media adapted to be displayed by means of a removable sheet film gate assembly and including eight record frames arranged in two rows and four columns.

DESCRIPTION OF THE ILLUSTRATIVE PREFERRED EMBODIMENTS

Figure 1:
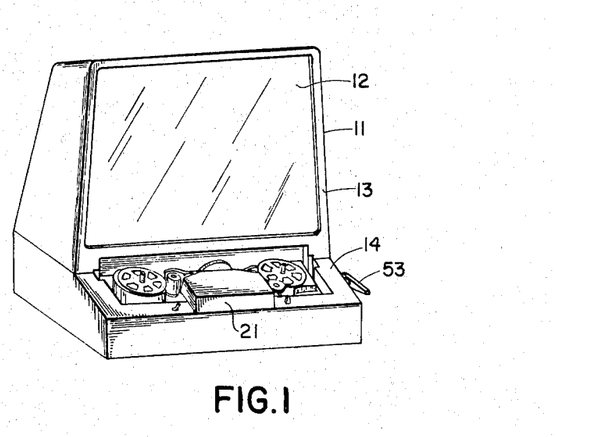
FIG. 1 is a perspective front view of a film reader unit comprising a preferred embodiment of the present invention.

Referring first to FIG. 1 of the drawings, it will be apparent that the subject film reader unit 11 is of the type wherein an image of a film frame is projected onto the back side of a translucent screen 12 vertically mounted in housing 13 behind and above a film deck portion of the unit indicated generally at 14. As depicted in greater detail in FIGS. 2 and 3, the film deck portion 14 of the unit includes a stationary support member 15 which supports an illumination system comprising coaxially aligned lamp 16, condenser lenses 17 and 18, and a filter member 19, such elements being enclosed by a removable cover member 21. As will be described in detail below, the image frame of a roll or sheet of record media which is to be displayed on the viewing screen is supported by the corresponding gate assembly at a predetermined focal point aligned with the illumination system, as illustrated by the portion of roll film 22, shown in FIG. 3. Ahead of this focal plane, and in coaxial alignment with the illumination system, an objective lens system is housed within lens tube 23 movably attached to a stationary support plate 24 by means of lens positioning member 25. Behind the objective lens system, a slanted mirror, not shown, is located adjacent the rearward wall of housing 13, and is adapted to reflect the light beam from the projection lens system onto the back surface of viewing screen 12. Accordingly, a greatly enlarged image of the illuminated film frame can be displayed by being focused onto the back surface of the screen. To bring the image into proper focus, lens positioning member 25 is movably mounted on support plate 24 in a manner adapted to allow adjustment of the lens system along its axis by focus adjusting means, not shown. Also, the objective lens system may include a prism arrangement whereby the projected image can be rotatably oriented on the viewing screen by rotating the lens tube 23 in lens positioning member 25 by means of manually accessible collar member 26.

Figure 4:
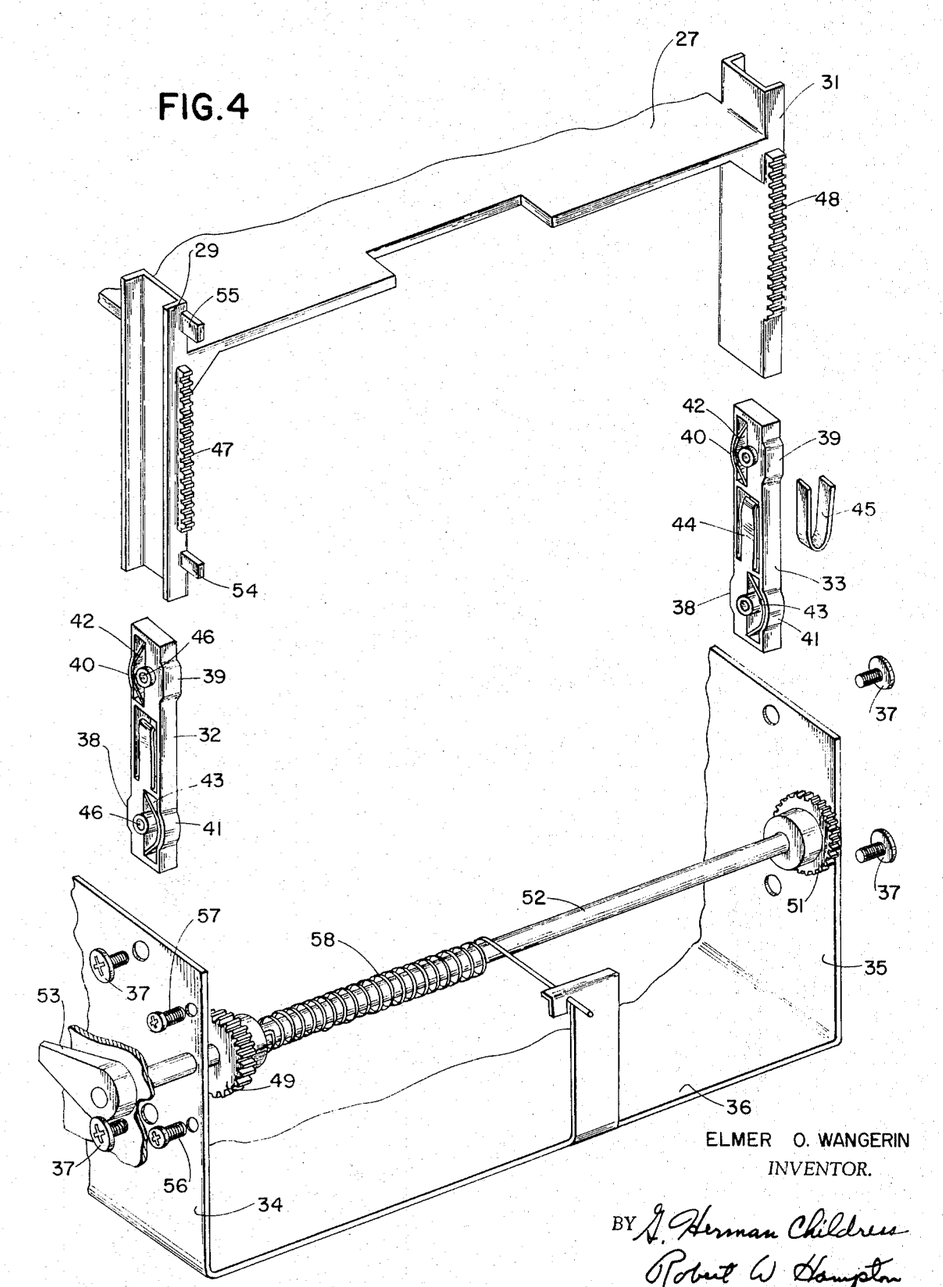
FIG. 4 is an exploded perspective rear view of the adjustable film deck plate support structure incorporated in the subject film reader unit.

A generally horizontal film deck plate 27 is located within opening 28 in housing 13 below and in generally parallel relation to the axis of the optical system of the reader unit 11. As is best depicted in FIG. 4, the deck plate 27 is supported for vertical sliding movement by the mating engagement of its upright end channel members 29 and 31 with corresponding generally vertical tongue members 32 and 33, the latter members being formed of molded plastic material and rigidly attached to the respective immovable vertical wall members 34 and 35 of internal frame 36 by means of screws 37. Since the deck plate 27 is cantilevered forwardly from the tongue members 32 and 33, those members are provided with forwardly and rearwardly facing guide lugs 38 and 39 located toward the respective lower and upper ends thereof, to engage and position the corresponding internal surfaces of the channel members 29 and 31. Additionally, resilient upper and lower guide pads 40 and 41, formed internally with the tongue member 32 and 33, are urged outwardly by corresponding leaf springs 42 and 43 to maintain the tongue members 32 and 33 in snug but slidable mating relation within the channel members 29 and 31. As shown at 44, tongue member 33 is also provided with a flexible ear, which is urged into engagement with the adjacent surface of the intermediate web of channel member 31 by a U-shaped spring 45 to position the deck plate 27 laterally by maintaining bosses 46 of tongue member 32 in resilient contact with the corresponding internal surface of channel member 29. The construction of the guide tongue members 32, 33 results in substantially line contact with the channel members 29, 31, thereby minimizing friction between the parts.

Along their rear edges, the channel members 29 and 31 are provided respectively with vertical rack segments 47 and 48, which mesh with corresponding spur gears 49 and 51 on rotatable cross shaft 52 extending between the vertical walls 34 and 35 of frame 36. Accordingly, by rotating shaft 52 by means of external lever 53, the operator can move the deck plate 27 vertically between the upper and lower positions thereof defined by the engagement of stop lugs 54 and 55 on channel member 29 with the corresponding stationary stop screws 56 and 57. To counteract the tendency of the deck plate 27 to move downwardly under its own weight, a counter-balancing coil spring 58 is wound about shaft 52 to bias that shaft 52 rotatively in a direction tending to raise the deck plate 27, thereby enabling the frictional drag of the tongue members 32 and 33 in the channel members 29 and 31 to maintain the vertical adjustment of the deck plate 27 established by manual movement of lever 53.

Figure 2:
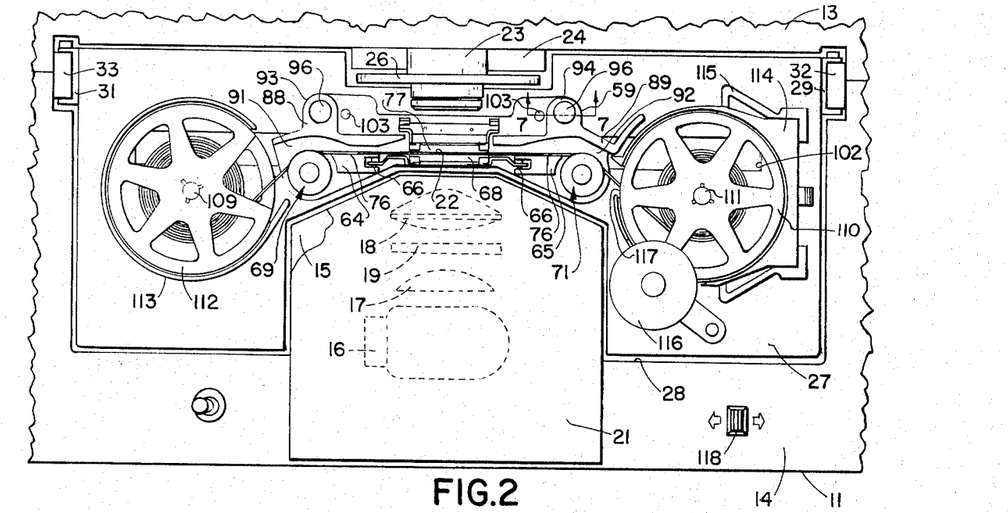
FIG. 2 is a plan view of the film deck portion of the reader unit depicted in FIG. 1 showing a removable roll film gate assembly installed thereon.
Figure 3:
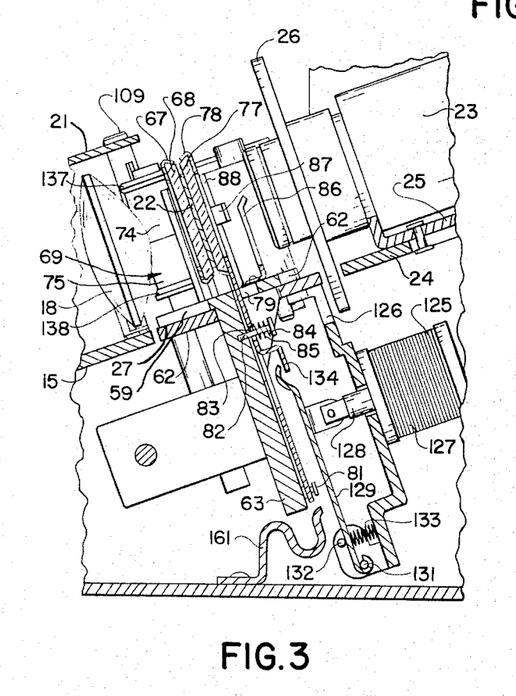
FIG. 3 is an enlarged cross sectional view of the film reader unit shown in FIG. 2.
Figures 5, 7:
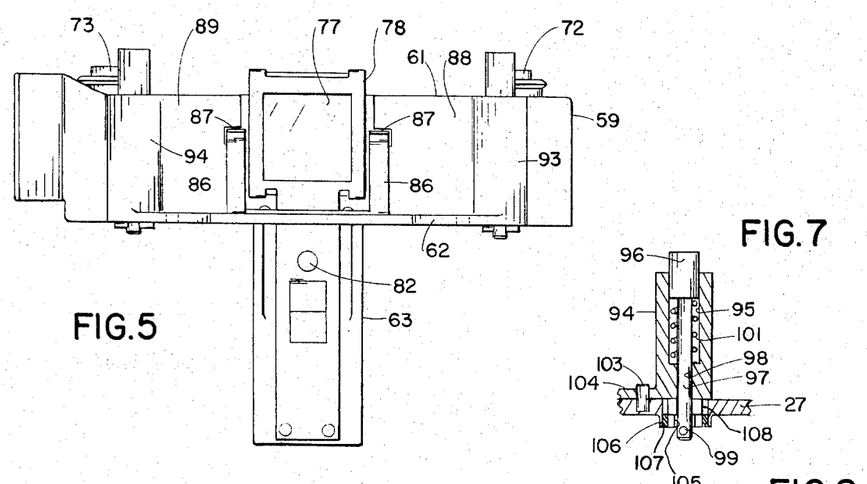
FIG. 5 is a rear elevational view of the removable roll film gate assembly illustrated in FIGS. 2 and 3.
FIG. 7 is a cross sectional view taken along line 7—7 of FIG. 2 through one of the mounting members of the roll film gate assembly and the corresponding portion of the film deck plate.
Figure 6:
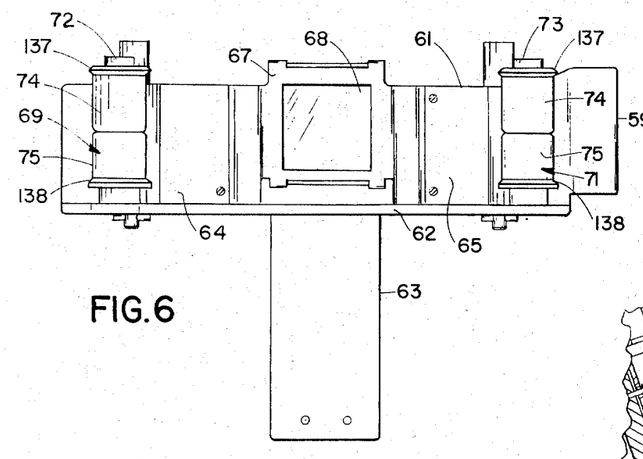
FIG. 6 is a front elevational view of the removable roll film gate assembly.

A roll film gate assembly 59 according to the present invention is shown mounted on the deck plate of reader unit in FIGS. 1 through 3 and removed therefrom in FIGS. 5 and 6. This assembly 59 includes a unitary body member 61 comprising a base flange 62 provided with a downwardly projecting tang member 63. Extending upwardly from the base flange 62 are a pair of generally coplanar front guide members 64 and 65 provided as shown in FIG. 2 with opposed slots 66. These slots 66 are adapted to receive and support corresponding ends of the front pressure plate frame member 67, which in turn supports a flat transparent front pressure plate 68. Adjacent the respective outer ends of the two front guide members 64 and 65, film guide roller units 69 and 71 are rotatably supported on respective shafts 72 and 73 extending upwardly from the base flange. These guide roller units 69 and 71 are located with the rearwardmost cylindrical film guide surfaces of upper and lower roller elements 74 and 75 positioned slightly behind the plane defined by a pair of coplanar, flat back surfaces 76 (see FIG. 2) of the front guide members 64 and 65 and the back surface of the front pressure plate 68 so that a strip of film extending tangentially between the back roller surfaces is spaced slightly out of contact with the adjacent surfaces of the pressure plate 68 and guide members 64 and 65.

Directly behind the front pressure plate 68 as seen in FIGS. 2 and 3, a similar flat transparent back pressure plate 77 is supported in alignment therewith by a back frame member 78 which extends downwardly through an opening 79 (FIG. 3) in the base flange 62. At its lower end, the back frame member 78 is attached to the tang member 63 by rivets 81 extending through oversize holes to loosely support the frame member 78 so that its upper end can be rocked forwardly and rearwardly. Below the base flange 62, another rivet member 82 extends through an oversize hole 83 in the back frame member 78, with its head 84 spaced therefrom. A light coil spring 85 is slightly compressed between the head 84 of the rivet 83 and the back frame member 78 to resiliently urge the back pressure plate 77 in a forward direction so that a film frame area located between the two pressure plates 68 and 77 is held in a flat condition thereby. Behind the back frame member 78 a pair of stop fingers 86 extend upwardly from the base flange 62 in the path of movement of ears 87 extending laterally from the frame member 78, thereby limiting the maximum separation of the back pressure plate 77 from the front pressure plate 68.

At opposite sides of the back pressure plate 77, rear guide members 88 and 89 extend upwardly from the base flange 62 and are spaced from the corresponding front guide members 64 and 65 to define respective film guide channels depicted at 91 and 92 in FIG. 2. The rearward surfaces of the rear guide members 88 and 89 are provided respectively with mounting members 93 and 94 extending upwardly from the base flange 62. As shown in cross section in FIG. 7, each of these mounting members 93 and 94 includes a central bore 95 adapted to receive the cylindrical knob 96 of a mounting shaft 97 extending downwardly through a smaller bore 98, below which a pin 99 extends through the mounting shaft 97. A compression spring 101 is received in bore 95 below knob 96 and resiliently urges the mounting shaft 97 upwardly to the position shown in FIGS. 5 and 6, in which pin 99 is engaged with the lower surface of the base flange 62 surrounding bore 98.

To adapt the reader unit 11 to accommodate roll type record media, the roll film gate assembly 59 is installed as shown in FIGS. 1 through 3 with its base flange 62 positioned atop the deck plate 27 and with its tang member 63 projecting downwardly through the central portion of elongate deck plate slot 102. In this installed position, gate assembly 59 is located accurately on the deck plate 27 by stationary guide pins 103 (FIGS. 1 and 7) extending upwardly from the deck plate 27 through mating guide holes 104 in the flange member 62.

When the roll film gate assembly 59 has been positioned as just described, each of the mounting members 93 and 94 is located with the lower tip of its mounting shaft 97 extending into a hole 105 of a retaining member 107, disposed within a boss 106. A slot 108 traverses retaining member 107 and hole 105 therein to accommodate pin 99 when the latter is rotationally aligned therewith. Thus, to releasably lock the gate assembly 59 in position, knobs 96 are manually depressed and rotated until pins 99 pass downwardly through slots 108, whereupon further rotation of the knobs 96 misaligns the pins 99 with the slots 108 so that the assembly is maintained in resilient contact with the deck plate 27 by springs 101. Obviously, of course, various other locking devices such as threaded studs could be employed for the same purpose.

Adjacent the opposite ends of deck plate slot 102, as shown in FIG. 2 permanently mounted film take-up and supply spindles 109 and 111 extend upwardly through the deck plate 27. The film take-up spindle 109 is adapted to drive a film take-up reel removably mounted thereon, as shown at 112, such reel being partially surrounded by a film guide member 113 which projects upwardly from the deck plate 27 without obstructing slot 102. The film supply spindle 111 similarly accommodates a film supply reel 110 which is illustrated partially enclosed within a film magazine unit 114 removably mounted to the deck plate 27 by a latch mechanism depicted generally at 115. With the film magazine unit 114 so installed on the reader unit 11, a pinch roller member 116 engages the adjacent portions of the reel flanges and squeezes them toward one another so that unwinding rotation of the film supply reel 110 by spindle 111 causes the leading end of the filmstrip on the film supply reel 110 to be delivered out of the magazine unit 114 through a throat 117 thereof and directed along film guide channels 92 and 91 of the roll film gate assembly. Upon emerging from guide channel 91, the leading end of the filmstrip enters between the flanges of the simultaneously rotated film take-up reel 112 and is automatically attached to the core thereby, by means not shown, thereby completing the threading operation. Since the present invention does not depend on the particular type of reel system employed or on the means used to thread the film from one reel to another, more specific details of the illustrated film mechanism and threading system are unnecessary to the present disclosure. However, an illustrative film magazine and film threading arrangement of this type is disclosed more fully in commonly assigned U. S. Pat. Application Ser. No. 591,235, entitled "Apparatus For and Method of Feeding Strip Material", filed in the name of Norman J. Rosenburgh on Nov. 1, 1966, now U.S. Pat. No. 3,467,340, to which reference may be had for further details thereof. Similarly, a film take-up reel adapted for use in such a reader device to automatically engage the leading end of the filmstrip is disclosed in commonly assigned U.S. Patent Application Ser. No. 730,222, entitled "Self-Threading Take-Up Reel," filed in the name of Elmer O. Wangerin, on May 20, 1968 now refiled as Continuing U.S. Application Ser. No. 827,102.

After the film has been threaded between the two reels, it can be wound selectively in either direction to locate any desired film at the film gate by means of control lever 118. A suitable spindle drive mechanism for effecting such selective disclosure movement of the film is disclosed in pending U. S. Pat. Application Ser. No. 730,345 entitled "Reel Spindle Drive Means for Film Reader or the Like," filed in the name of Elmer O. Wangerin, on May 20, 1968, and likewise need not be explained in detail for purposes of the present disclosure. Accordingly, such a system is depicted only schematically in FIG. 9 as comprising a reversible electric motor 119 connected by shaft 121 to spindles 109 and 111 through respective gear and clutch units 122 and 123, whereby the spindles 109 and 111 are rotated to wind the film from the supply reel 110 to the take-up reel 112 whenever the motor 119 runs in one direction and vice versa; with the speed of such film movement being determined by the speed of the motor 119. The speed and direction of rotation of the motor 119, in turn, are regulated by a control unit represented at 124. This unit can be considered as comprising a double pole double throw switch controlling a pair of variable rheostats to cause the motor to run at progressively faster speeds as control lever 118 is moved progressively away from its central open circuit position in the direction in which the film is to be moved.

Figure 9:
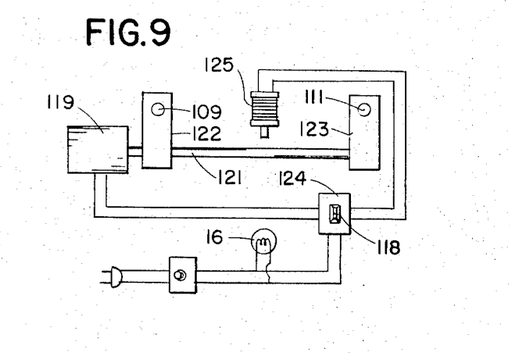
FIG. 9 is a schematic illustration of the electrical circuit and the spindle drive mechanism of the film reader unit.
Figure 10:
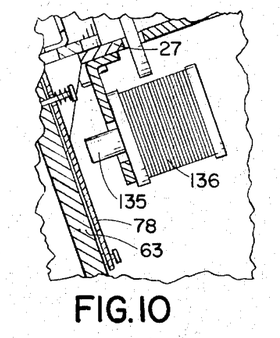
FIG. 10 corresponds generally to a portion of FIG. 3 and illustrates an alternate means for separating the pressure plates of the roll film gate assembly.

As the spindles 109 and 111 rotate during the film threading operation, i.e., clockwise as viewed in FIG. 1, it is apparent that the pressure plates 68 and 77 must be separated to allow the film to pass from guide channel 92 into guide channel 91. Also, as previously mentioned, the pressure plates 68 and 77 should be separated also whenever the film is in motion to prevent it from being scratched or otherwise damaged. In other words, the moving film should be guided through the gate assembly 59 only by the smooth rotatable guide roller units 69 and 71, out of positive contact with stationary elements of the gate assembly 59. For this purpose, a solenoid 125, shown in FIGS. 3 and 9, is attached to the deck plate 27 by a bracket 126 and is connected to control unit 124 in a manner such that the solenoid coil 127 is energized to retract armature 128 whenever the drive motor 119 is in operation. The armature of the solenoid 125 is connected to a lever 129 pivotally attached to solenoid bracket 126 by pin 131 and is biased toward its illustrated position in contact with stop pin 132 by a light coil spring 133. Whenever the solenoid 125 is energized, the upper end of lever 129 engages an ear 134 on the back pressure plate frame member 78 and thereby rocks that member 78 rearwardly to a position in which ears 87 thereof are in contact with stop fingers 86, thus separating the back pressure plate 77 from the front pressure plate 68. Alternatively, as shown at FIG. 10, the back pressure plate frame member 78 can be made of iron or some other magnetically permeable alloy and attracted directly by the stationary core member 135 of an electromagnet 136, rather than employing the above-described solenoid 125 including a movable armature 128 within the solenoid coil 127. While it is known, per se, to employ electromagnetic means to open a film gate, it will be seen that the present invention enables the operative cooperation between the solenoid 125 and the movable pressure plate 78 to be established automatically upon installation of the roll film gate assembly 59 in a simple and straightforward manner and without the need for supplemental manipulation of electrical and mechanical connections.

Figure 8:
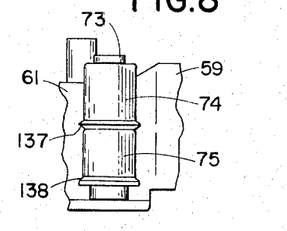
FIG. 8 corresponds to a portion of FIG. 6 and depicts the illustrated film guide roller adapted to accommodate a strip of roll film of relatively narrow predetermined width.

As previously mentioned, the illustrated reader unit 11 is adapted to accommodate filmstrips of two predetermined widths, for example 35mm and 16mm film. When a length of 35mm film is received within the film gate, as shown at 22 in FIG. 3, the film 22 is positioned laterally between end flanges 137 and 138 of the respective upper and lower elements 74 and 75 of guide roller units 69 and 71. Thus, when the deck plate 27 is in its lower-most position, the portion of the filmstrip within the gate is centrally aligned with the optical axis of the optical system of the film reader unit 11. When 16mm film is employed with the reader unit 11, the lower flanges of the film supply and take-up reels assume the same positions as do the lower flanges of the corresponding 35mm film reels. Accordingly, the film traverses the lower portion of the film gate with its lower edge in contact with the lower flanges 138 of the guide roller units 69 and 71. To accurately maintain the film in predetermined lateral relation to the gate, the upper elements 74 of the guide roller units 69 and 71 are removed from the respective roller shafts 72 and 73 and inverted thereon as shown in FIG. 8 so that flanges 137 of the upper roller elements 74 now engage and guide the upper edge of the 16mm filmstrip. Since the centerline of the 16mm filmstrip is therefore below that of the 35mm filmstrip relative to the deck plate, the entire gate assembly 59 is raised along with the deck plate 27 by means of lever 53 so that the film within the gate is in central alignment with the lens system and is displayed at the center of screen 12.

Figures 11, 12, 13:
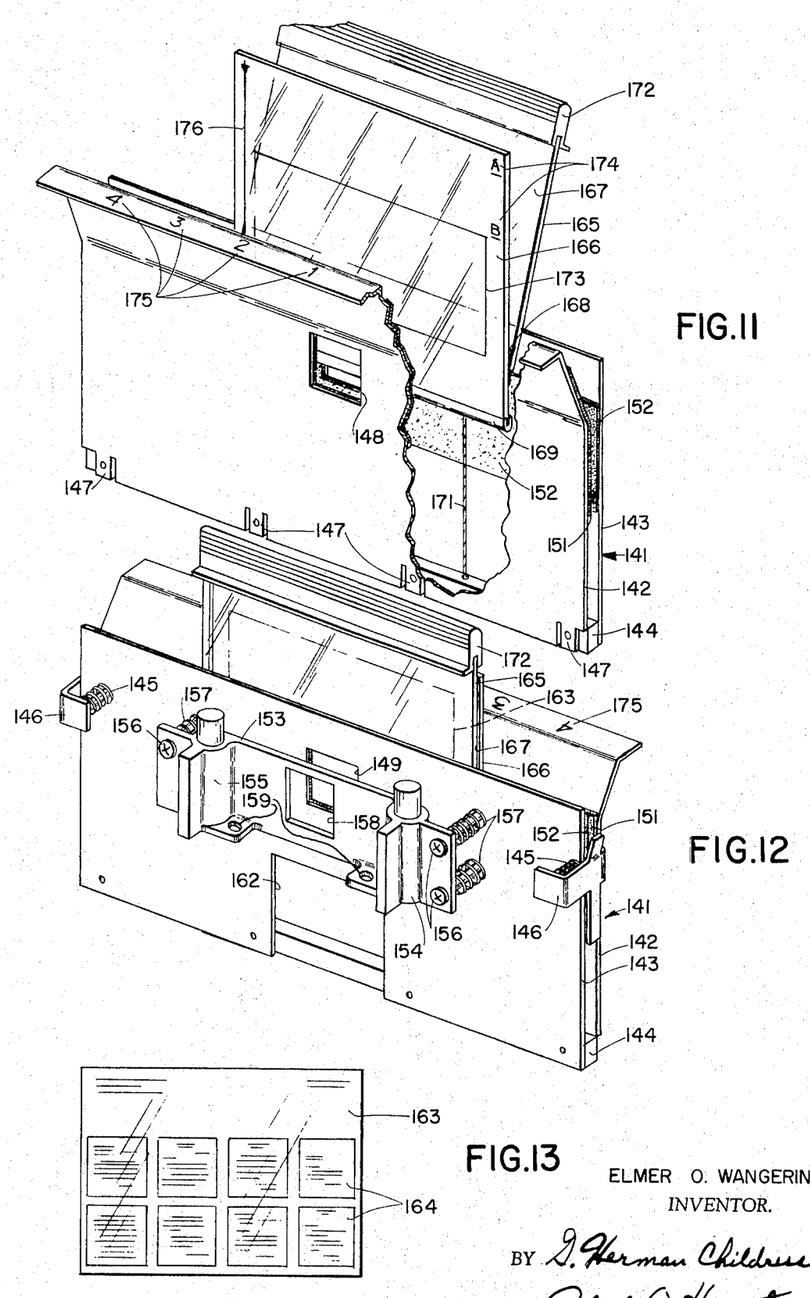
FIG. 11 is a front perspective view, partially broken away, of a preferred embodiment of a sheet film gate assembly adapted to convert the reader unit to accommodate record media in sheet form.
FIG. 12 is a rear perpsective view of the sheet film gate assembly shown in FIG. 11.

Referring now to FIGS. 11 and 12, the sheet film gate assembly 141 adapted to convert the reader unit 11 to accommodate sheet record media will be seen to comprise a pair of front and rear plate members 142 and 143. Along their respective lower edges, these two plate members 142 and 143 are secured to a spacer bar 144 which maintains them in generally parallel spaced alignment with one another. A pair of springs 145 are compressed between the rear plate member 143 and ears 146 projecting rearwardly from the front plate member 142 to urge the plate members 142 and 143 toward each other by flexing the tongues 147 by which the front plate member 142 is attached to the spacer bar 144. Centrally located rectangular apertures 148 and 149 in the respective front and back plate members 142 and 143 are also aligned with each other and with corresponding rectangular openings in respective cushion strips or pads 151 and 152 which are formed of plush or other soft compressible material and extend respectively along the opposed upper internal surfaces of the two plate members 142 and 143.

As illustrated in FIG. 12, a mounting frame 153 comprising a pair of mounting members 154 and 155 is adjustably attached to plate member 143 by adjusting screws 156 and springs 157 with the two mounting members 154 and 155 located at opposite sides of aperture 149 and the corresponding aperture 158 in the mounting frame. These two mounting members 154 and 155 are substantially similar to the corresponding members 93 and 94 of the previously described roll film gate assembly 59 and are adapted to be attached to the deck plate 27 in the same manner.

To install this assembly 141 in the reader unit 11, after the roll film gate assembly 59, the film take-up reel 112 and the film supply reel 110 have been removed, the lower portions of the two plate members 142 and 143 are inserted in the elongate deck plate slot 102 (see FIG. 2) and the assembly 141 is releasably locked in position by the mounting member shafts in the same manner previously described. As in the case of the roll film gate assembly 59, the location of this assembly 141 is established by the reception of guide pins 103 within mating guide holes 159 so that plate members 142 and 143 are perpendicular to the axis of the lens system with apertures 148 and 149 aligned therewith. Since the deck plate 27 normally will be in its lowered position whenever this gate assembly 141 is mounted on the reader unit 11, the stability of the gate assembly 141 can be further increased by means of a stationary saddle member 161 shown in FIG. 3, which is adapted to receive the lower edge of the gate assembly 141 in the region of recess 162 in plate member 143.

A sheet of record media 163 usable with this gate assembly 141 is represented by FIG. 13 as comprising a rectangular piece of thin transparent film or paper material including eight record frames 164 arranged in two rows and four columns, below an upper margin adapted to provide record identifying data. To support such a sheet in a flat focal plane in the sheet film gate assembly 141, and to protect it from scratching, heat, or tearing, this gate assembly 141 includes a film envelope 165 comprising two glass envelope plates 166 and 167 hinged together by a flexible hinge strip 168. Alternatively, the film envelope 165 could be formed of transparent plastic materials, in which case the flexibility of the plate material itself might accomplish the function of the flexible hinge strip. Along its lower edge, plate 166 is provided with a channel strip 169 attached at each end to spacer bar 144 by flexible cords, one of which is shown at 171 in FIG. 11. These cords 171 allow the envelope 165 to be moved laterally between plates 142 and 143 but prevent it from being removed from the gate assembly 141 or raised above the loading position shown in FIG. 11.

When the envelope 165 is raised manually to its loading position, by means of handle member 172 on envelope plate 167, the envelope plates can be hinged apart as illustrated in FIG. 11 to enable a sheet 163 of record media to be inserted between the two plates 166 and 167 in alignment with the plate area indicated by a rectangular guide line 173 inscribed on plate 166. Thereupon, the plates 166 and 167 are hinged together to sandwich the record sheet 163 between the two plates 166 and 167, which are then slid downwardly and laterally to position any desired frame at a viewing position in alignment with apertures 148 and 149.

Whenever the envelope 165 is located with both of its plates 166 and 167 between cushion strips 151 and 152, those strips 151 and 152 engage the opposite surfaces of the envelope 165 with sufficient force to maintain the plates 166 and 167 in snug sandwiching engagement with the record sheet 163 and to prevent the envelope 165 from sliding downwardly by gravity, while at the same time protecting the transparent plates 166 and 167 themselves from being scratched by sliding contact with hard surfaces of the assembly.

To facilitate positioning the envelope 165 to display any particular frame of the record sheet 163 therein, envelope plate 166 is provided with visible, row designating indicia 174 comprising symbols "A" and "B." Column indicating indicia 175 comprising numerals 1 through 4 are also provided along the top edge of front plate member 142. By this means, if the operator wishes, for example, to view the second frame from the right in the upper or "A" column, he depresses the envelope to position the reference line below the symbol "A" in alignment with the top edge of plate 142 and slides the envelope 165 sideways until reference line 176 on plate 166 is aligned with numeral 2, etc. Obviously, similar reference means can be provided to position record sheets comprising different numbers of frames and/or different arrangements of the frames, for example, by means of corresponding differently colored reference symbols.

The invention has been described in detail with reference to preferred embodiments thereof, but it will be understood that variations and modifications can be effected within the spirit and scope of the invention as described hereinabove and as defined by the appended claims.

I claim:

1. Projection apparatus having a projection axis and adapted for interchangeably receiving and retaining at least one removable film gate, said apparatus comprising:

a removable film gate of the type constructed for handling an information bearing medium in strip form having image bearing portions located along the length thereof, such film gate having first and second pressure plates for retaining a selected portion of a strip therebetween substantially in a plane, at least one of the first and second pressure plates being movably mounted on such film gate for movement between a first position closely adjacent the other of the first and second pressure plates to retain a selected strip portion therebetween and a second position remote from the first position to provide clearance for movement of a strip between the plates;

support means on said apparatus for releasably receiving and supporting said film gate in an operative position in relation to said projection axis;

film gate drive means on said apparatus for automatically moving the movable pressure plate of said gate between said first and second positions; and cooperatively associated means respectively on said film gate and said film gate drive means for effecting actuation of said film gate by said film gate drive means when said film gate is supported in said operative position on said apparatus by said support means.

2. Projection apparatus as defined in claim 1 which further includes strip film drive means on said apparatus cooperable with said film gate when said gate is supported on said apparatus in said operative position for driving the strip film through the film gate, said film gate drive means being responsive to actuation and deactuation of said strip film drive means to automatically open the opposed members of the strip film gate prior to actuation of said strip film drive means and to automatically close the opposed members about a film strip received therebetween after deactuation of said strip film drive means.

3. Projection apparatus as defined in claim 2 wherein said support means further includes a movably mounted member having an elongated slot extending transversely of the optical axis of said projection means and adapted to receive a portion of said film gate when the gate is supported by said member.

4. Projection apparatus as defined in claim 3 which further includes adjusting means cooperatively connected to said member for selectively varying the position of said member with respect to the projection axis of said apparatus thereby enabling the position of the film gate supported by said member to be varied with respect to said axis.

5. Projection apparatus having a projection plane and adapted for receiving at least one removable film gate, said apparatus comprising:

a housing;

projection means, supported by said housing, for projecting an image from a selected portion of an information bearing medium located in said projection plane;

first and second spaced rotatable spindles, supported by said housing;

first and second winding members for storing information bearing media in strip form respectively removably mounted on said first and second spindles for rotation therewith;

first drive means connected to said spindles for bidirectionally driving said spindles so that each of said winding members mounted thereon will wind or unwind said strip stored therein depending upon the direction in which said spindles are driven;

a removable film gate adapted for handling an information bearing medium in strip form having image bearing portions located along the length thereof, said gate having first and second pressure plates for retaining a selection portion of said strip therebetween substantially in said projection plane, at least one of said first and second pressure plates being movably mounted on said film gate for movement between a first position closely adjacent the other of said first and second pressure plates to retain said selected strip portion therebetween and a second position spaced from said first position to provide clearance for movement of said strip between said plates;

support means supported by said housing and cooperable therewith for alternatively and releasably receiving and supporting said film gate in an operative position in relation to said projection means; and second drive means on the housing responsive to actuation and deactuation of said first drive means, cooperable with said film gate when said film gate is supported on said apparatus, for automatically moving said movable pressure plate from said first to said second position prior to actuation of said first drive means and for automatically moving said movable pressure plate from said second to said first position after deactuation of said first drive means.

6. Projection apparatus as defined in claim 5 wherein said support means further includes a movably mounted member having an elongated slot extending transversely of the optical axis of said projection means, said member adapted to receive a portion of said film gate when said gate is supported by said member.

7. Projection apparatus as defined in claim 6 which further includes adjusting means cooperatively connected between said housing and said member for selectively varying the position of said member with respect to the optical axis of said projection means thereby enabling the position of the film gate supported by said common support member to be varied with respect tr said optical axis.

* * * * *